US007339930B2

United States Patent
Mehta (10) Patent No.: US 7,339,930 B2
(45) Date of Patent: Mar. 4, 2008

(54) METHOD AND APPARATUS FOR PERFORMING AN ADDRESS LOOKUP USING A MULTI-BIT TRIE WITH BACKTRACKING

(75) Inventor: Ashish K. Mehta, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1105 days.

(21) Appl. No.: 10/302,600

(22) Filed: Nov. 22, 2002

(65) Prior Publication Data

US 2004/0100960 A1 May 27, 2004

(51) Int. Cl.
*H04L 12/28* (2006.01)

(52) U.S. Cl. .................. 370/392; 370/408; 370/464; 370/465

(58) Field of Classification Search ............. 370/464, 370/465, 392, 393, 395.3, 395.31, 395.32, 370/395.54, 408, 429; 709/238–244; 711/216, 711/221
See application file for complete search history.

(56) References Cited

U.S. PATENT DOCUMENTS

| | | | |
|---|---|---|---|
| 5,787,430 A * | 7/1998 | Doeringer et al. .......... 707/100 |
| 5,909,440 A * | 6/1999 | Ferguson et al. .......... 370/389 |
| 6,018,524 A * | 1/2000 | Turner et al. .............. 370/392 |
| 6,192,051 B1 * | 2/2001 | Lipman et al. ............ 370/389 |
| 6,212,184 B1 * | 4/2001 | Venkatachary et al. ..... 370/392 |
| 6,614,789 B1 * | 9/2003 | Yazdani et al. ............ 370/392 |
| 6,859,455 B1 * | 2/2005 | Yazdani et al. ............ 370/392 |
| 7,031,320 B2 * | 4/2006 | Choe ..................... 370/395.31 |

OTHER PUBLICATIONS

Publication entitled "Fast Address Lookups Using Controlled Prefix Expansion," by V. Srinivasan et al., Washington University in St. Louis, ACM Transactions on Computer Systems, vol. 17, No. 1, Feb. 1999, pp. 1-40.

\* cited by examiner

*Primary Examiner*—Wing Chan
*Assistant Examiner*—Mark A. Mais
(74) *Attorney, Agent, or Firm*—Park, Vaughan & Fleming LLP (57) ABSTRACT

One embodiment of the present invention provides a system that facilitates performing a fast address lookup within a packet forwarder to determine where to forward a packet. Upon receiving the packet at an input link of the packet forwarder, the system reads a destination address from the packet. The system uses this destination address to lookup a corresponding entry in a forwarding table that is organized as a multi-bit trie. If the corresponding entry does not identify the output link for the packet, the system backtracks through the multi-bit trie to locate an entry with a prefix that matches the destination address and that identifies the output link for the packet. Finally, the system forwards the packet to the identified output link.

14 Claims, 4 Drawing Sheets

METHOD AND APPARATUS FOR PERFORMING AN ADDRESS LOOKUP USING A MULTI-BIT TRIE WITH BACKTRACKING

BACKGROUND

1. Field of the Invention

The present invention relates to the design of packet forwarding mechanisms for computer networks. More specifically, the present invention relates to a method and an apparatus for performing a fast address lookup within a packet forwarder using a multi-bit trie with backtracking.

2. Related Art

As traffic on the Internet continues to increase at an exponential rate, larger volumes of packets are passing through the packet forwarding engines that forward the packets between computer systems. Hence, these packet forwarding engines are coming under increasing pressure to process packets rapidly.

Unfortunately, the address lookup process is becoming a major bottleneck to packet forwarding performance. Upon receiving a packet on an input link, a packet forwarder first performs a lookup in a forwarding table based on a destination address of the packet to determine an output link to send the packet to. As the number of destination addresses grows larger, this forwarding table can potentially become very large, which can potentially slow down the address lookup process.

A number of techniques have been developed to perform this address lookup efficiently. Most of these techniques look for a "longest matching prefix." For example, see "Fast Address Lookups Using Controlled Prefix Expansion," by V. Srinivasan and G. Varghese, *ACM Transactions on Computer Systems*, Vol. 17, No. 1, February 1999, pp. 1-40 (hereinafter referred to as the "Srinivasan paper"). Instead of storing entries for all possible destination addresses, the system described in the Srinivasan paper instead stores entries for "prefixes" that cover sets of destination addresses residing on the same network. Hence, in order to determine which output link to send a packet to, a packet forwarder simply looks for an entry in the forwarding table with the longest matching prefix, and then sends the packet to an output link specified by the entry.

The technique described in the Srinivasan paper uses a data structure known as a "multi-bit trie" to store the forwarding table entries. A multi-bit trie comprises a tree of nodes that contain arrays. For example, a 32-bit Internet Protocol (IP) address can be divided into four eight-bit portions, each one of which can be used to index a different node in the trie. Each of these nodes contains a $2^n$-entry array, with an entry for each of the possible $2^n$ values of a corresponding n-bit portion of the IP address.

In the system described in the Srinivasan paper, if a specific prefix is not an exact multiple of eight bits, the prefix is expanded into multiple entries. For example, a 20-bit prefix is expanded into the 16 possible 24-bit values covered by the 20-bit prefix, and an entry for each of the 16 possible values is inserted into the trie. Hence, the 20-bit prefix 2.3.128/20 expands into 16 24-bit entries (2.3.128, 2.3.129, . . . , 2.3.143).

Although this prefix expansion technique facilitates fast address lookups, it has a number of drawbacks. (1) It complicates the process of inserting or deleting a prefix in the forwarding table because a single prefix can potentially generate a large number of entries in the forwarding table. Moreover, the prefix insertion process involves performing a complicated controlled prefix expansion operation. (2) It further complicates the prefix deletion process because the system has to first determine if an entry in the table is an "expanded prefix" or an "unexpanded prefix" in order to determine how to perform the deletion. (3) It similarly complicates the process of updating a prefix. (4) It also complicates the process of walking through the forwarding table, for example to see all the routes in the system. This is because the system must somehow distinguish between "expanded" and "unexpanded" prefixes.

Hence, what is needed is a method and an apparatus for looking up a destination address without the problems of the prefix expansion technique yet maintaining a reasonably fast lookup time.

SUMMARY

One embodiment of the present invention provides a system that facilitates performing a fast address lookup within a packet forwarder to determine where to forward a packet. Upon receiving the packet at an input link of the packet forwarder, the system reads a destination address from the packet. The system uses this destination address to lookup a corresponding entry in a forwarding table that is organized as a multi-bit trie. If the corresponding entry does not identify the output link for the packet, the system backtracks through the multi-bit trie to locate an entry with a prefix that matches the destination address and that identifies the output link for the packet. Finally, the system forwards the packet to the identified output link.

In a variation on this embodiment, upon receiving a request to delete an entry for a prefix from the forwarding table, the system uses the prefix to lookup the entry the forwarding table, wherein the entry identifies an output link associated with the prefix. The system then deletes the entry from the forwarding table, and deletes one or more nodes from the multi-bit trie, if necessary.

In a variation on this embodiment, upon receiving a request to insert an entry for a prefix into the forwarding table, the system inserts the entry into the forwarding table, wherein the entry that identifies an output link associated with the prefix. In doing so, the system creates one or more nodes in the multi-bit trie, if necessary, to accommodate the entry.

In a variation on this embodiment, backtracking through the multi-bit trie involves scanning backwards through a current node in the multi-bit trie looking for an entry with a prefix that matches the destination address and that identifies the output link for the packet. If a matching entry is not found in the current node, the system recursively repeats the scanning process for preceding nodes in the multi-bit trie until a matching entry is found.

In a variation on this embodiment, the destination address is an Internet Protocol (IP) address. Note that the present invention generally can be applied to any type of IP address, including IPv4 and IPv8 addresses.

In a variation on this embodiment, the output link for the packet is identified by an entry in the forwarding table.

In a variation on this embodiment, each node in the multi-bit trie includes 256 entries for each of the 256 possible combinations of a corresponding eight-bit portion of the destination address.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Packet Forwarder

Figure 1:
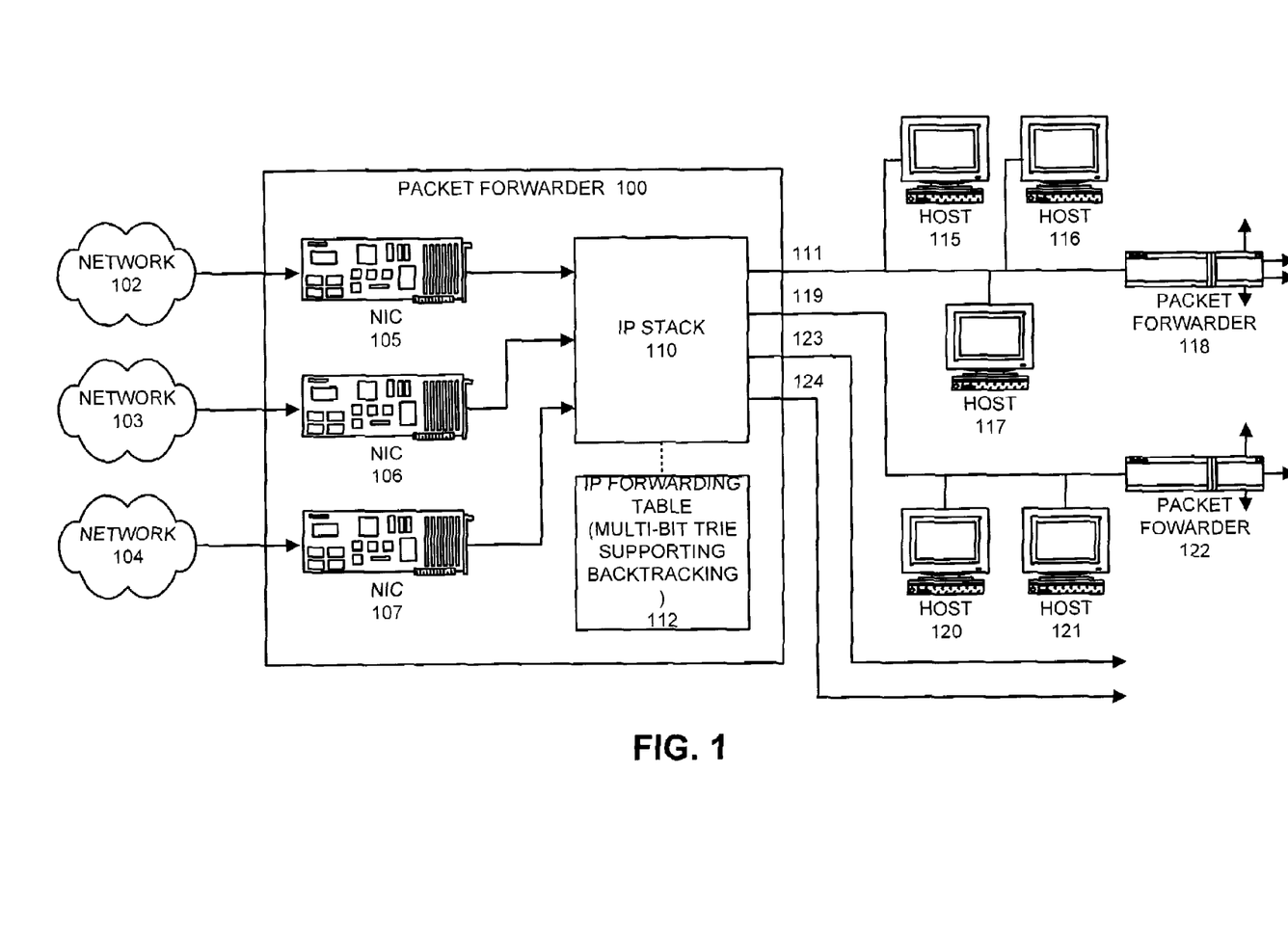
FIG. 1 illustrates a packet forwarder in accordance with an embodiment of the present invention.

FIG. 1 illustrates a packet forwarder 100 in accordance with an embodiment of the present invention. Packet forwarder 100 can generally include any node on a computer network that receives and forwards packets to other nodes on the network.

Packet forwarder 100 receives packets from a number of networks, including networks 102-104. Networks 102-104 can generally include any type of wire or wireless communication channel capable of coupling together computing nodes. This includes, but is not limited to, a local area network, a wide area network, or a combination of networks.

Packet forwarder 100 forwards packets received from networks 102-104 to various output links 111, 119, 123 and 124. Note that these output links can be coupled to hosts that receive the packets and/or other packet forwarders. For example, in FIG. 1, output link 111 is coupled to hosts 115-117 and packet forwarder 118. Similarly, output link 119 is coupled to hosts 120-121 and packet forwarder 122. Output links 123 and 124 are also coupled to hosts and/or packet forwarders, which are not shown in FIG. 1.

Packets received from networks 102-104 pass through network interface cards (NICs) 105-107, respectively, and then into IP stack 110. Various mechanisms within IP stack 110 use forwarding table 112 to route packets to output links 111, 119, 123 and 124 based on the destination addresses of the packets. Note that forwarding table 112 is organized as a multi-bit trie that supports backtracking as is described in more detail below with reference to FIGS. 2-5.

Forwarding Table

Figure 2:
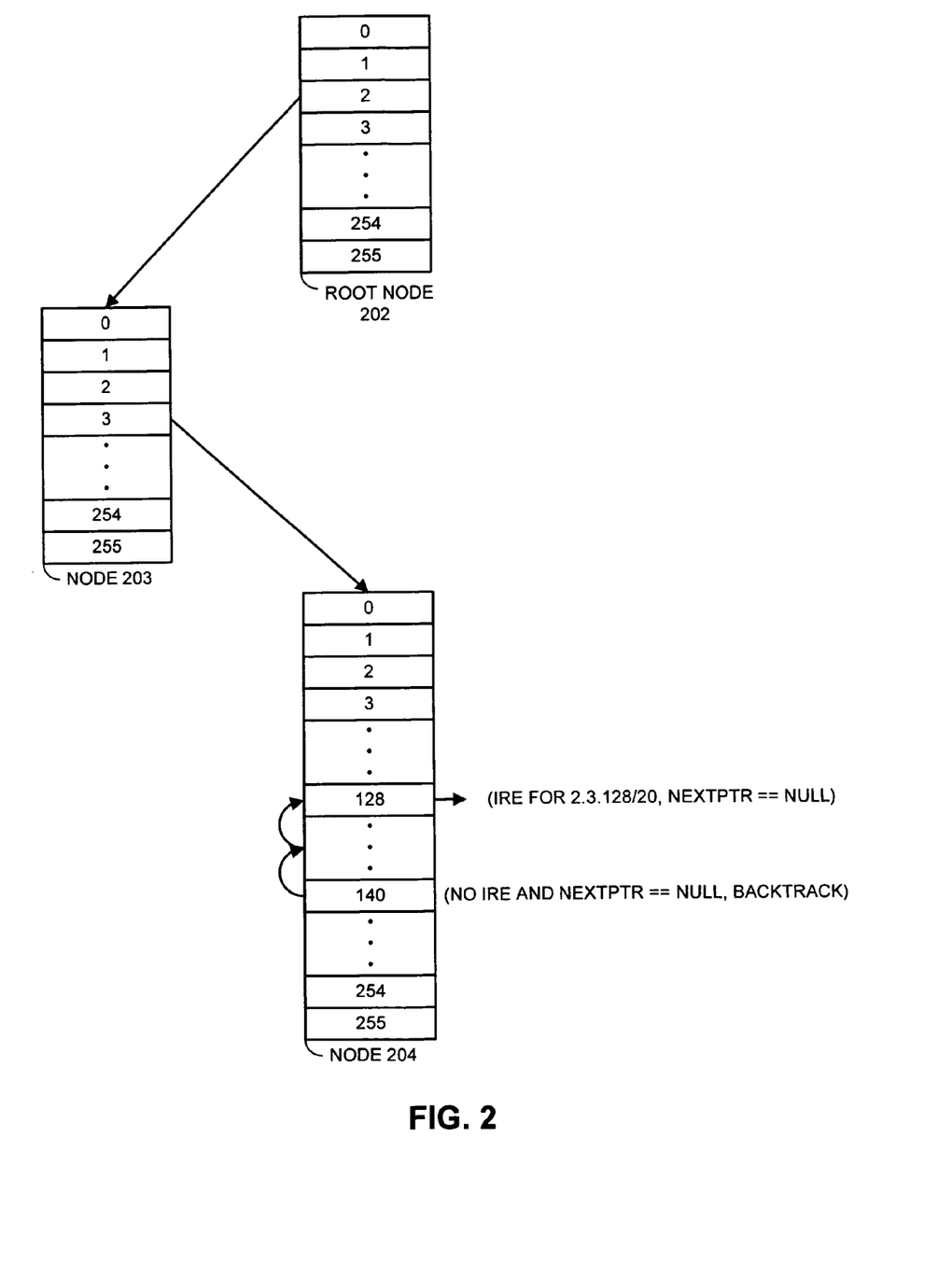
FIG. 2 illustrates an exemplary forwarding table in accordance with an embodiment of the present invention.

FIG. 2 illustrates an exemplary forwarding table organized as a multi-bit trie that supports backtracking in accordance with an embodiment of the present invention. Note that FIG. 2 illustrates only three out of possibly thousands of nodes in the trie.

Each of the illustrated nodes 202-204 contains 256 entries that correspond to the 256 possible values for an eight-bit portion of a destination address for a packet. Each entry potentially contains one or more Internet Route Entries (IREs) that specify corresponding output links for the prefixes. Each entry can also contain a "next pointer," which points to a lower-level trie node.

Unlike the technique described in the Srinivasan paper, this exemplary forwarding table stores only a single entry for each prefix. For example, the prefix 2.3.128/20 covers all possible destination addresses starting with the prefix 00000010 00000011 1000. In order to insert this prefix into the trie, an IRE for the prefix is inserted into entry 128 of node 204 and the next pointer for entry 128 is set to NULL.

Now suppose that a packet is subsequently received with a destination address 2.3.140.250. The first number "2" in this destination address is used to lookup entry 2 in node 202. Entry 2 contains a next pointer to node 203.

The second number "3" in the destination address is then used to look up entry 3 in node 203. Entry 3 contains a next pointer to node 204.

Next, the third number "140" in the destination address is used to lookup entry 140 in node 204. Entry 140 contains no IRE and its next pointer is set to NULL. In this case, the system backtracks up node 204 looking for an entry with a matching prefix. This matching prefix is finally found in entry 128. The system then examines the IRE in entry 128 to determine an output link for the packet. Note that this backtracking process can continue up through higher-level nodes of the trie (through use of a backing array) if no matching entries are found in lower-level nodes.

This backtracking can be accomplished in a number of ways. A backtracking array can be maintained to keep track of how to backtrack to higher-level nodes of the trie. Alternatively, the trie can include back pointers from each child node to its parent node to facilitate backtracking.

Process of Looking up a Destination Address

Figure 3:
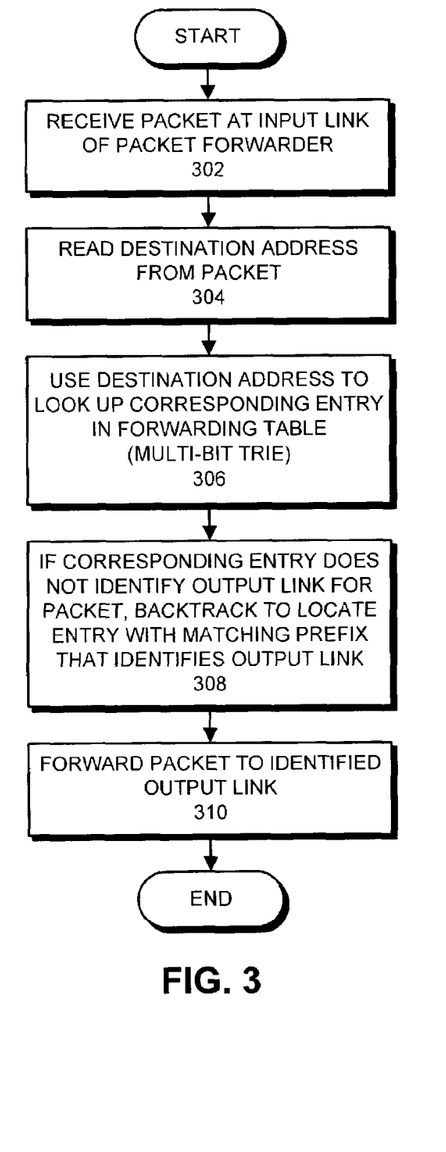
FIG. 3 presents a flow chart illustrating the process of looking up a destination address in accordance with an embodiment of the present invention.

FIG. 3 presents a flow chart illustrating the process of looking up a destination address in accordance with an embodiment of the present invention. The process starts when the system receives a packet at an input link for packet forwarder 100 (step 302). Next, the system reads the destination address from the packet (step 304) and uses the destination address to look up a corresponding entry in forwarding table 112—which is organized as a multi-bit trie (step, 306). If the corresponding entry does not identify an output link for the packet, the system backtracks through the trie to locate an entry with a matching prefix that contains an IRE that identifies an output link for the packet (step 308). The system then forwards the packet to the identified output link (step 310).

Process of Deleting a Prefix

Figure 4:
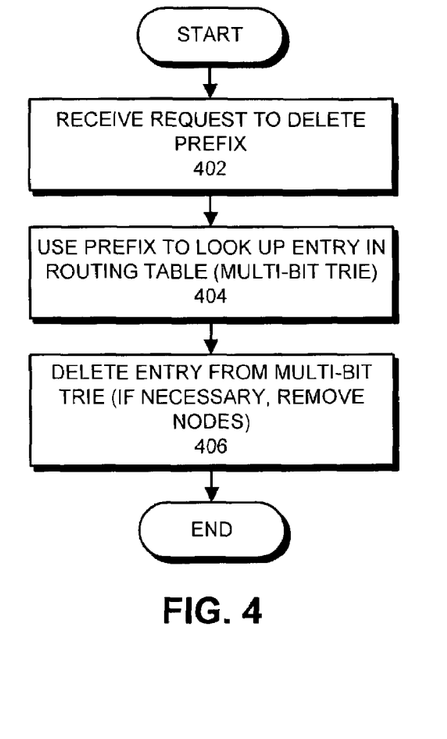
FIG. 4 presents a flow chart illustrating the process of deleting a prefix from a forwarding table in accordance with an embodiment of the present invention.

FIG. 4 presents a flow chart illustrating the process of deleting a prefix from a forwarding table in accordance with an embodiment of the present invention. Upon receiving a request to delete a prefix from forwarding table 112 (step 402), the system uses the prefix the lookup an entry in forwarding table 112 (step 404). This may involve following pointers to lower-level nodes as was described above with reference to FIG. 2. When the entry is located, the system deletes it (step 406). Note that this deletion process may involve removing nodes from the multi-bit trie if necessary.

Process of Inserting a Prefix

Figure 5:
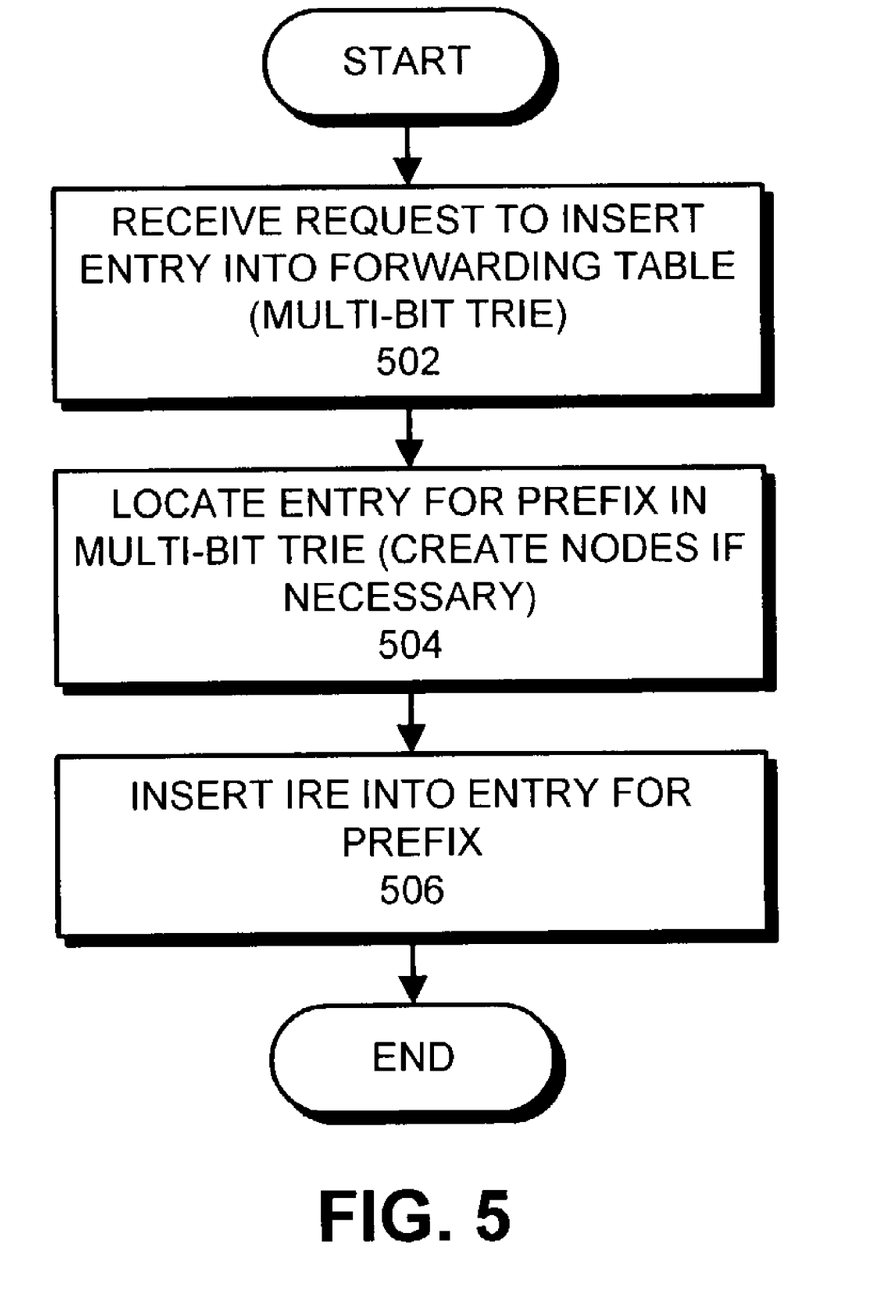
FIG. 5 presents a flow chart illustrating the process of inserting a prefix into a forwarding table in accordance with an embodiment of the present invention.

FIG. 5 presents a flow chart illustrating the process of inserting a prefix into a forwarding table in accordance with an embodiment of the present invention. Upon receiving a request to insert an entry into forwarding table 112 (step 502), the system locates an entry for the prefix, which may involve creating nodes in the multi-bit trie, if necessary (step 504). Next, the system inserts an IRE into the entry for the prefix (step 506).

Note that the above-described insertion and deletion processes do not involve prefix expansion, and hence, only insert or delete a single entry in forwarding table 112. Furthermore, there is no confusing distinction between an expanded prefix an unexpanded prefix. It is also easier to manage a forwarding table organized in this way because there only exists a single entry for each prefix, which makes it easier to determine what prefixes are entered into the table.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

Exemplary Code

Presented below is exemplary code for the address lookup, prefix insertion and prefix deletion operations in accordance with an embodiment of the present invention.

```
/*
 * This file implements a multi-bit trie (MBT) based lookup. No prefix
expansion
 * or prefix capture is performed. Instead at the last level of the trie,
 * backtracking is done (which *may* traverse other levels)
 */
#include <sys/socket.h>
extern debug_level;
/*
 * 4 levels, ecompassing 8-bits each of a 32-bit IP address are defined.
 * Further optimizations are possible by reducing the number of levels
 */
#define LEVEL1              8
#define        LEVEL2              16
#define LEVEL3              24
#define LEVEL4              32
#define LEVEL1_MASK         0xff000000
#define LEVEL2_MASK         0x00ff0000
#define LEVEL3_MASK         0x0000ff00
#define LEVEL4_MASK         0x000000ff
#define        NUM_LEVELS     4
#define        BITS_TO_SHIFT  8
static int     stride_length = 8;
typedef struct ire_s {
    ipaddr_t       subnet;
    ipaddr_t       netmask;
    ipaddr_t       gateway;
    struct ire_s   *ire_next;
} ire_t;
/*
 * The core data structure. Each node may point to a linked list of
 * IRE's and has a next pointer. Each trie has at most 2^n of these
 * nodes, where n is the number of bits for the trie level. That is,
 * if n==8 then 256 nodes per trie
 */
typedef struct node {
    ire_t *ire;
    struct node *nptr;
    struct node *parent;
    uint_t level;
} node_t;
/*
 * This structure is used for backtracking
 */
typedef struct trieidx {
    node_t *nptr;
    uchar_t level;
} trieidx_t;
trieidx_t *bt[NUM_LEVELS];      /* used for backtracking */
#define LEVEL_IDX(p, m, i) ((p & m) >> ((NUM_LEVELS – (i + 1))*BITS_TO_SHIFT))
node_t *root_arr;    /* points to the head of the trie */
static ipaddr_t mask_arr[NUM_LEVELS];
extern ip_mask_to_index(ipaddr_t);
ire_t *backtrack(int, ipaddr_t);
void mbt_delete(ipaddr_t, ipaddr_t);
ire_t *mbt_lookup(ipaddr_t, node_t **, boolean_t);
void mbt_initialize( ) {
    int i;
    mask_arr[0] = LEVEL1_MASK;
    mask_arr[1] = LEVEL2_MASK;
    mask_arr[2] = LEVEL3_MASK;
    mask_arr[3] = LEVEL4_MASK;
    if ((root_arr = (node_t *)malloc(sizeof(node_t)*256)) == NULL) {
        printf("malloc failed for root_arr\n");
        exit(–1);
    }
    for (i = 0; i <=255; i++)
        root_arr[i].level = i;
    for (i = 0; i < NUM_LEVELS; i++)
        bt[i] = (trieidx_t *)calloc(1, sizeof(trieidx_t));
}
/*
 * Insert new prefix in MBT
 */
void ire_add_mbt(ire_t *ire) {
    int i = 0, j, target_level;
    node_t *nodep, *ptr, *pnodep;
    ipaddr_t prefix, level_mask;
    uint_t prefixlen;
    uchar_t level_idx, target_level_mask;
    ire_t *tmp;
    prefix = (ire->subnet & ire->netmask);
    prefixlen = ip_mask_to_index(ire->netmask);
    if (prefixlen <= LEVEL1) {
        target_level = LEVEL1;
    } else if (prefixlen <= LEVEL2) {
        target_level = LEVEL2;
    } else if (prefixlen <= LEVEL3) {
        target_level = LEVEL3;
    } else {
        target_level = LEVEL4;
    }
    ptr = root_arr;
    pnodep = NULL;
    while (target_level >= stride_length) {
        level_mask = mask_arr[i];
        level_idx = LEVEL_IDX(prefix, level_mask, i);
        nodep = &(ptr[level_idx]);
        nodep->parent = pnodep;
        pnodep = nodep;
        target_level –= stride_length;
        if (target_level <= 0)  {/* Last hop in path */
            if (nodep->ire != NULL){/* same prefix, different netmask */
                /* Prefix with longer netmask towards the head */
                if (prefixlen>ip_mask_to_index(nodep->ire->netmask)) {
                    tmp = nodep->ire;
                    nodep->ire = ire;
                    ire->ire_next = tmp;
                } else {
                    /* Insert at tail */
                    nodep->ire->ire_next = ire;
                    ire->ire_next = NULL;
                }
            } else {
                nodep->ire = ire;
```

```
            ire->ire_next = NULL;
    }
    return;
}
if (nodep->nptr == NULL) {
    nodep->nptr = (node_t *)calloc(256, sizeof(node_t));
    if (nodep->nptr == NULL) {
        printf("malloc failed in insert_in_trie \n");
        exit (-2);
    }
    for (j = 0; j <= 255; j++)
        nodep->nptr[j].level = j;
}
ptr = nodep->nptr;
i++;
    }
}
/*
 * Given a destination, lookup and return the IRE which has the best matching
 * prefix, if found, else return NULL.
 */
ire_t *mbt_lookup(ipaddr_t prefix, node_t **delnodep, boolean_t del_flag) {
    uchar_t level_index;
    int i = 0;
    node_t *nodep, *lnodep;
    ire_t *bmp_ire = NULL, *btire; /* IRE which has the best matching prefix */
    node_t *ptr = root_arr;
    level_index = LEVEL_IDX(prefix, mask_arr[0], i);
    nodep = &(ptr[level_index]);
    /* XXX: can further optimize by loop unrolling */
    while (nodep->nptr) {
        if (nodep->ire != NULL)
            bmp_ire = nodep->ire;
        i++;
        bt[i]->level = level_index = LEVEL_IDX(prefix, mask_arr[i], i);
        bt[i]->nptr = nodep->nptr;
        nodep = &(nodep->nptr[level_index]); /* next level node */
    }
    if (del_flag) { /* Called for delete ? */
        *delnodep = nodep;
        return (NULL);
    }
    /*
     * First check if current node has an ire in it, if so, return that.
     * If not, then backtrack, to see if there is better matching prefix.
     * If not return the best matching prefix saved from previous trie level
     */
    if (nodep->ire) {
        return (nodep->ire);
    } else {        /* backtrack */
        btire = backtrack(i, prefix);
    }
    if ((btire == NULL) && (bmp_ire != NULL))
        return (bmp_ire);
    else
        return (btire);
}
ire_t *backtrack(int i, ipaddr_t prefix) {
    uchar_t level_index;
    node_t *np;
    ire_t *npire;
    while (i) {
        level_index = bt[i]->level;
        /*
         * The following while loop is constructed as such since a pass through the
         * following instructions is needed for the level_index value of zero and
         * at the same time we want to start *at* the level_index of previous
         * level
         * (if we reach it). So for example, while(level_index--) {loop} will
         * defeat
         * the latter
         */
        do {
            np = &(bt[i]->nptr[level_index]);
            npire = np->ire;
            while (npire) {
                /* there could be several IREs, same prefix; different netmasks */
                if (npire->subnet == (prefix & npire->netmask))
                    return(npire);
                npire = npire->ire_next;
            }
        } while ((uint_t)level_index--);
        i--;
    }
    return (NULL);
}
/*
 * Delete a given prefix (with a specified netmask)
 */
void mbt_delete(ipaddr_t prefix, ipaddr_t netmask) {
    node_t *nodep = NULL, *freenodep;
    ire_t *tmp, *npire;
    /*
     * -Lookup the node containing the prefix
     * -Walk through entries in the node till matching prefix/netmask is found
     * -Remove the entry from the list
     * -If this was the only entry in the node and in the nodeblk, free nodeblk
     * -Repeat previous step till parent is reached
     */
    (void)mbt_lookup(prefix, &nodep, B_TRUE);
    if (nodep == NULL)
        return;
    npire = tmp = nodep->ire;
    if (npire == NULL)
        return;
    while(npire) {
        if (npire->subnet == (prefix & npire->netmask)) {
            if (tmp != npire)
                tmp->ire_next = npire->ire_next;
            else
                nodep->ire = npire->ire_next;
            free(npire);
            break;
        }
        tmp = npire;
        npire = npire->ire_next;
    }
    while (nodep) {
        freenodep = nodep;
        nodep = nodep->parent;
        free_nodeblk(freenodep);
    }
}
/*
 * Check to see if there are other nodes that are in use in
 * this nodeblk. If not, free the nodeblk
 */
free_nodeblk(node_t *nodep) {
    uint_t i;
    boolean_t node_inuse = B_FALSE;
    node_t *nodeblkp = NULL;
    nodeblkp = nodep - nodep->level;
    nodep = nodeblkp;
    for (i = 0; i <= 255; i++) {
        if ((nodep[i].nptr != NULL) || (nodep[i].ire != NULL)) {
            node_inuse = B_TRUE;
            break;
        }
    }
    if (!node_inuse) {
        for (i = 0; i <= 255; i++)
            free(nodeblkp + i);
    }
}
```

What is claimed is:

1. A method for performing a fast address lookup within a packet forwarder to determine where to forward a packet, comprising:
   receiving the packet at an input link of the packet forwarder;
   reading a destination address from the packet;
   using the destination address to lookup a corresponding entry in a forwarding table, wherein the forwarding table is organized as a multi-bit trie;
   examining the corresponding entry in the forwarding table to identify an output link for the packet;
   if the corresponding entry does not identify the output link for the packet, backtracking through the multi-bit trie to locate an entry with a prefix that matches the destination address and that identifies the output link for the packet, wherein backtracking through the multi-bit trie involves scanning backwards through multiple consecutive entries within a current node in the multi-bit trie looking for an entry with a prefix that matches the destination address and that identifies the output link for the packet, and wherein the multiple consecutive entries have the prefix that matches the destination address; and
   forwarding the packet to the identified output link.

2. The method of claim 1, further comprising:
   receiving a request to delete an entry for a prefix from the forwarding table;
   using the prefix to lookup the entry for the prefix in the forwarding table, wherein the entry identifies an output link associated with the prefix; and
   deleting the entry from the forwarding table, wherein deleting the entry involves deleting one or more nodes in the multi-bit trie, if necessary.

3. The method of claim 1, further comprising:
   receiving a request to insert an entry for a prefix into the forwarding table; and
   inserting the entry into the forwarding table;
   wherein inserting the entry involves creating one or more nodes in the multi-bit trie, if necessary, to accommodate the entry; and
   wherein inserting the entry involves inserting information into the entry that identifies an output link associated with the prefix.

4. The method of claim 1, wherein if a matching entry is not found in the current node, backtracking through the multi-bit trie involves recursively repeating the scanning process for preceding nodes in the multi-bit trie until a matching entry is found.

5. The method of claim 1, wherein the destination address is an Internet Protocol (IP) address.

6. The method of claim 1, wherein the output link for the packet is identified by an entry in the forwarding table.

7. The method of claim 1, wherein each node in the multi-bit trie includes $2^n$ entries for each of the $2^n$ possible combinations of a p corresponding n-bit portion of the destination address.

8. An apparatus performs a fast address lookup within a packet forwarder to determine where to forward a packet, comprising:
   the packet forwarder;
   an input link of the packet forwarder configured to receive the packet;
   an address lookup mechanism configured to,
      read a destination address from the packet,
      use the destination address to lookup a corresponding entry in a forwarding table, wherein the forwarding table is organized as a multi-bit trie,
      examine the corresponding entry in the forwarding table to identify an output link for the packet, and
      if the corresponding entry does not identify the output link for the packet, to backtrack through the multi-bit the to locate an entry with a prefix that matches the destination address and that identifies the output link for the packet, wherein while backtracking through the multi-bit trie, the address lookup mechanism is configured to scan backwards through multiple consecutive entries within a current node in the multi-bit trie looking for an entry with a prefix that matches the destination address and that identifies the output link for the packet, and wherein the multiple consecutive entries have the prefix that matches the destination address; and
   a forwarding mechanism configured to forward the packet to the identified output link.

9. The apparatus of claim 8, further comprising a deletion mechanism, wherein upon receiving a request to delete an entry for a prefix from the forwarding table, the deletion mechanism is configured to:
   use the prefix to lookup the entry for the prefix in the forwarding table, wherein the entry identifies an output link associated with the prefix; and to
   delete the entry from the forwarding table, wherein deleting the entry involves deleting one or more nodes in the multi-bit trie, if necessary.

10. The apparatus of claim 8, further comprising an insertion mechanism, wherein upon receiving a request to insert an entry for a prefix into the forwarding table, the insertion mechanism is configured to:
   insert the entry into the forwarding table;
   wherein inserting the entry involves creating one or more nodes in the multi-bit trie, if necessary, to accommodate the entry; and
   wherein inserting the entry involves inserting information into the entry that identifies an output link associated with the prefix.

11. The apparatus of claim 8, wherein while backtracking through the multi-bit the, if a matching entry is not found in the current node, the address lookup mechanism is configured to recursively repeat the scanning process for preceding nodes in the multi-bit trie until a matching entry is found.

12. The apparatus of claim 8, wherein the destination address is an Internet Protocol (IP) address.

13. The apparatus of claim 8, wherein the output link for the packet is identified by an entry in the forwarding table.

14. The apparatus of claim 8, wherein each node in the multi-bit trie includes $2^n$ entries for each of the $2^n$ possible combinations of a corresponding n-bit portion of the destination address.

* * * * *

UNITED STATES PATENT AND TRADEMARK OFFICE
CERTIFICATE OF CORRECTION

PATENT NO. : 7,339,930 B2 Page 1 of 1
APPLICATION NO. : 10/302600
DATED : March 4, 2008
INVENTOR(S) : Ashish K. Mehta It is certified that error appears in the above-identified patent and that said Letters Patent is hereby corrected as shown below:

Column 10, line 10, please replace the word "the" with the word --trie--.

Column 10, line 45, please replace the word "the" with the word --trie--.

Signed and Sealed this

Third Day of June, 2008

JON W. DUDAS
*Director of the United States Patent and Trademark Office*